United States Patent [19]
Lafferty et al.

[11] Patent Number: 5,818,573
[45] Date of Patent: Oct. 6, 1998

[54] OPTHALMIC LENS INSPECTION SYSTEM

[75] Inventors: W. Michael Lafferty, Leucadia; Charles S. Slemon, Encinitas; W. James Frandsen, San Diego, all of Calif.

[73] Assignee: PBH, Inc., Sunnyvale, Calif.

[21] Appl. No.: 796,744

[22] Filed: Feb. 6, 1997

[51] Int. Cl.⁶ .................................................. G01B 11/27
[52] U.S. Cl. ........................................ 356/127; 451/240
[58] Field of Search ................................. 356/124–127, 356/239, 237; 451/42, 390, 240, 323

[56] References Cited

U.S. PATENT DOCUMENTS

| | | | |
|---|---|---|---|
| 3,542,476 | 11/1970 | Nord | 356/124 |
| 3,619,067 | 11/1971 | Howland . | |
| 3,904,294 | 9/1975 | Gold et al. . | |
| 5,080,482 | 1/1992 | Benz et al. | 356/127 |
| 5,443,152 | 8/1995 | Davis . | |
| 5,500,732 | 3/1996 | Ebel et al. . | |
| 5,528,357 | 6/1996 | Davis | 356/124 |

FOREIGN PATENT DOCUMENTS

| | | |
|---|---|---|
| 2057832 | 6/1992 | Canada . |
| 0 491 663A1 | 6/1992 | European Pat. Off. . |
| 0 604 174A2 | 6/1994 | European Pat. Off. . |
| 0 604 178A1 | 6/1994 | European Pat. Off. . |
| 0 604 179A2 | 6/1994 | European Pat. Off. . |
| 0 604 180A2 | 6/1994 | European Pat. Off. . |
| 0 605 171A2 | 7/1994 | European Pat. Off. . |
| 0 605 990A2 | 7/1994 | European Pat. Off. . |
| 0 607 692A2 | 7/1994 | European Pat. Off. . |
| 0 686 841A2 | 12/1995 | European Pat. Off. . |
| 59-108934 A | 12/1982 | Japan . |
| 59-160734 A | 9/1984 | Japan . |
| 4-309834 | 11/1992 | Japan . |

*Primary Examiner*—Hoa Q. Pham
*Attorney, Agent, or Firm*—Burns, Doane, Swecker & Mathis, LLP

[57] ABSTRACT

An ophthalmic lens inspection system includes an illumination assembly which generates diffuse light and transmits the diffuse light through an ophthalmic lens disposed in an inspection position, the diffuse light having a diffusivity of between 30° and 50°. An imaging assembly generates a set of signals representing selected portions of the diffuse light transmitted through the ophthalmic lens in the inspection position. A moving mechanism supports the imaging and illumination assemblies for common movement relative to the contact lens, to bring a reference point into alignment with the center of the imaging assembly.

10 Claims, 5 Drawing Sheets

OPTHALMIC LENS INSPECTION SYSTEM

BACKGROUND OF THE INVENTION

1) Field of the Invention

The present invention generally relates to systems for inspecting ophthalmic lenses, and more particularly, to a system for automatically inspecting contact lenses.

2) Discussion of Related Art

The testing of contact lenses for flaws has been mainly performed manually by human inspectors who view each contact lens under a microscope such as described in the background section of European patent application 0604178A1. Such a technique is subject to human error, lacks uniformity, and is tedious.

Some automated systems have been developed for automatically inspecting contact lenses. One such system is disclosed in U.S. Pat. No. 5,500,732 issued to Ebel et al on Mar. 19, 1996. In this system, a multitude of ophthalmic lenses are continuously moved along a path through a lens inspection station by a walking beam mechanism. At the lens inspection station, the lenses are moved at a constant velocity under cameras, each camera inspecting a different lens, and the lenses are imaged. In the inspection station, the lenses are illuminated by strobe light through a ground glass diffuser, an air spaced doublet collector lens, and a field lens. The doublet lens is to collimate the light from the ground glass diffuser and focus a portion of the light beam onto a focal point forward of a imaging pixel array, and the field lens is to focus a portion of the diffuse light onto the pixel array and for correcting divergence of the light beam caused by the lens package (holder, water and lens) under inspection, according to the Ebel et al. patent. This illumination subsystem purportedly provides a diffuse background pattern on the image plane giving the peripheral zones of the lenses a different grey level than the back optic zone to enhance the image of the boundary between the peripheral bevelled zone and the central optical zone of the contact lenses. The images of each of the lenses are then processed to locate the lens in the image and to detect various defects such as torn lenses and cosmetic flaws known as puddles formed by slight depressions in the surface of the lens.

There are a number of problems with this type of illumination system. One problem is that this type of illumination system requires precise alignment and spacing of the optical elements if the desired quality of the image and the desired results are to be obtained. For instance, if the doublet lens is slightly out of position along the optical axis of the camera and focusses the diffuse light on the pixel array, an image of the ground glass will be superimposed on the image of the lens, thus diminishing the quality of the image and the inspection results. Also, this system captures an image of the lenses and depends on computer processing to reject features of the lens that are not of interest. Also, the Ebel et al system requires an extra field lens to undo the optical properties of the lens package being inspected.

Another example of an automatic ophthalmic lens inspection system is disclosed in European Patent Application 0 604 178 A1, which describes a strobe illumination system. The strobe illumination reportedly permits a lens to be electronically imaged while the lens is in motion and suppresses the details of the light source and the lens package by providing a diffuse strobe illumination. The strobe illumination is provided by a 5 joule strobe lamp, a flashed opal diffuser and an operative adjacent the ophthalmic lens. Selective spacing and aperture diameter control the cone angles of the diffuse light passing through the ophthalmic lens to suppress details of the lens package and lamp.

Another example of automatic ophthalmic lens inspection system is disclosed in European Patent Application 0 604 692 A2, which uses dark field illumination using a pair of imaging lenses where only deflected light is imaged.

Also, it would be desirable in any automated system to minimize the possibility of the contact lens becoming damaged. The chances of such damage occurring increases as the handling and movement of contact lenses increases. Therefore, a further object of the present invention is to minimize the amount of movement to which the contact lenses are subject during a testing operation.

Further, it would be advantageous to avoid using a strobe light to image an ophthalmic lens continuously moving past on an inspection point as disclosed in U.S. Pat. No. 5,500,732, and European Patent Applications 0 604 178 A1 and 0 604 180 A2.

SUMMARY OF THE INVENTION

The present invention relates to an apparatus for positioning an ophthalmic lens with respect to an inspection instrument such as one or more cameras for inspecting the lens. The apparatus comprises a transparent surface on which a contact lens can be placed, an illuminator for illuminating a contact lens disposed on the surface, an imaging device directed toward a side of the lens in a direction substantially perpendicular to the surface for capturing an image of at least a portion of an outer edge of the contact lens, an analyzer for receiving the image and determining therefrom a geometrical center of the lens and a relationship between the center and a reference point which is fixed with respect to the imaging device and the inspection instrument, and moving means for moving the imaging device and the inspection instrument together relative to the contact lens to bring the reference point into alignment with the center.

The invention also relates to a method of positioning a contact lens with respect to an inspection instrument. The method comprises the steps of placing a contact lens on a transparent surface, illuminating the contact lens while on the surface, directing an imaging device toward a side of the contact lens in a direction substantially perpendicular to the surface and capturing an image of at least a portion of an outer edge of the contact lens with the imaging device, determining from the image a geometrical center of the contact lens and a relationship between the center and a reference point which is fixed with respect to the imaging device and the inspection instrument, and moving the imaging device and the inspection instrument together relative to the contact lens to bring the reference point into alignment with the center.

Further, the present invention avoids using the complicated optics disclosed in U.S. Pat. No. 5,500,732, and avoids the need for aperture and spacing adjustments disclosed in European Patent Application 0 604 178 A1. Instead, the present invention uses bright field imaging provided by means of an extended diffuse light source which fills the image cone of the camera, in conjunction with a small aperture to provide a large depth of field to reduce or eliminate the effects of the optical properties of the lens and lens holder (if any) being inspected. The diffuse light source preferably has a diffusivity within the limited range of between 20° and 60°, and even more preferably between 30° and 50°, and most preferably has a diffusivity of 35°.

Also, another advantage of the present invention is that, unlike the system disclosed in U.S. Pat. No. 5,500,732, it does not have to compensate for the focussing power of the ophthalmic lens being inspected, the lens holder, or water in which the lens might be emersed. It is largely independent of the focussing power of these components and it will work on non-hydrated or hydrated lenses (whether emersed in water or not).

An additional advantage of the inventive system is that the side camera(s) focus on only a portion of the ophthalmic lens being inspected, which results in higher resolution images of the lens.

Specifically, the invention relates to an apparatus for positioning a contact lens with respect to an inspection instrument, including a transparent surface on which a contact lens can be placed; an illuminator for illuminating a contact lens disposed on the surface; an imaging device directed toward a side of the lens in a direction substantially perpendicular to the surface for capturing an image of at least a portion of an outer edge of the contact lens; analyzing means for receiving the image and determining therefrom a geometrical center of the lens and a relationship between the center and a reference point which is fixed with respect to the imaging device and the inspection instrument; and moving means for moving the imaging device and the inspection instrument together relative to the contact lens to bring the reference point into alignment with the center.

Further, the invention relates to a method of positioning a contact lens with respect to an inspection instrument, including the steps of (A) placing a contact lens on a transparent surface; (B) illuminating the contact lens while on the surface; (C) directing an imaging device toward a side of the contact lens in a direction substantially perpendicular to the surface and capturing an image of at least a portion of an outer edge of the contact lens with the imaging device; (D) determining from the image a geometrical center of the contact lens and a relationship between the center and a reference point which is fixed with respect to the camera and the inspection instrument; and (E) moving the imaging device and the inspection instrument together relative to the contact lens to bring the reference point into alignment with the center.

BRIEF DESCRIPTION OF THE DRAWING

The objects and advantages of the invention will become apparent from the following detailed description of a preferred embodiment thereof in connection with the accompanying drawing in which like numerals designate like elements and in which.

DETAILED DESCRIPTION OF A PREFERRED EMBODIMENT OF THE INVENTION

Figure 1:
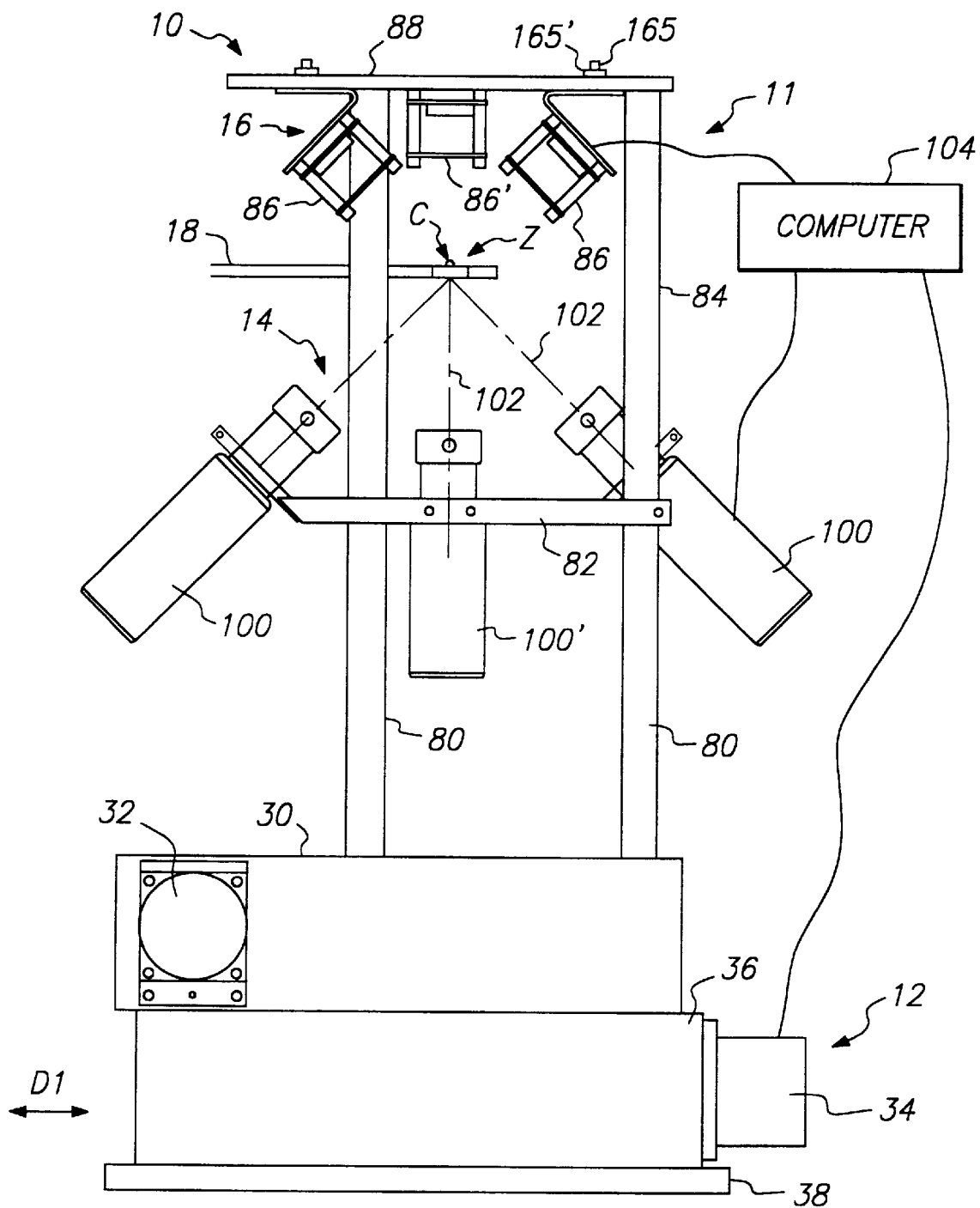
FIG. 1 is a side elevational view of an apparatus according to the present invention.

A lens inspection station 10 comprises a support structure 11 having a platform assembly 12, an imaging assembly 14, and an illumination assembly 16. Ophthalmic lenses such as contact lenses C to be inspected are brought to an inspection position upon a support 18 having transparent windows 20. The contact lens support 18 could comprise a manually or automatically movable carousel or other suitable structure. The contact lenses C are inspected in a non-hydrated state or in a hydrated state, either simply wet or in a liquid such as deionized water or saline solution.

Support Structure

As will be explained in greater detail hereinafter with reference to FIGS. 1 and 2, the platform assembly 12 of the support structure 11 enables the imaging and illumination assemblies 14, 16 to be moved together as a unit horizontally relative to the contact lens support 18 for obtaining a proper alignment between the contact lens C and the imaging and illumination assemblies 14, 16.

The imaging and illumination assemblies 14, 16 are carried by an upper platform 30 of the platform assembly 12, the latter being movable in two dimensions within a horizontal plane by means of two drive motors 32, 34, respectively. The upper platform 30 is seated upon a lower platform 36, the latter being seated on a base 38 of the platform assembly 12.

The lower platform 36 is slidably mounted on the base 38 for movement relative thereto in a first horizontal direction D1 (i.e., left-to-right in FIG. 1) by means of guides which may comprise conventional linear module bearings disposed between the base and the lower platform. Any suitable number of such bearings (e.g., four) can be provided. The upper platform 30 is slidably mounted on the lower platform 36 for movement relative thereto in a second horizontal direction D2 (perpendicular to the paper in FIG. 1) extending orthogonally relative to the first direction D1. This slidable mounting is also established by guides such as linear module bearings situated between the upper and lower platforms 30, 36.

Mounted to the upper platform 30 are upstanding posts 80 which support a horizontal imaging table 82 in overlying relationship to the platform assembly 12 and in underlying relationship to the contact lens support 18. The illumination assembly 16 is attached to the imaging table 82 by upstanding posts 84. The illumination assembly 16 comprises a series of illumination devices 86, 86', described below, affixed to the underside of a plate 88 to which the posts 84 are attached.

It will be appreciated from the foregoing that the imaging and illumination assemblies 14, 16 are movable together as a unit with the upper platform 30. Mounted on the imaging table 82 are a series of imaging devices 100, 100' which can comprise cameras of the imaging assembly 16, described in further detail below. Those cameras include an inspection instrument in the form of a circular array of outer or side cameras 100 oriented at an acute angle, (e.g., 45°) relative to the plane of the contact lens support 18 (a horizontal plane), and a vertically extending central camera 100'. The image of a contact lens C from the central camera 100' functions to align the inclined cameras 100 relative to a contact lens C being inspected by bringing a reference point into alignment with the center of the contact lens C. All of the cameras 100, 100' are arranged so that their longitudinal axes converge at the reference point located just below the plane of the contact lens support 18 along an optical axes 102 of the central camera 100' and of the side cameras 100. The illuminating devices 86, 86' are aligned with respective ones of the cameras 100, 100', with the illumination devices 86, 86' being directed downwardly toward an upper side of the contact lens support 18, and the cameras 100, 100', directed upwardly toward an underside of the contact lens support 18.

The central camera 100' is operably connected to a computer 104 which is connected to the motors 32, 34 for displacing the platform 30 in a manner bringing the convergence reference point of the cameras into alignment with a geometrical center of the contact lens C, as explained below. The inclined cameras 100 then perform a quality inspection of the contact lens C. In practice, three computers and two computer displays can be used wherein image processing cards inside the computers process optical images of contact lenses. The images are displayed on one display. The control and status information are displayed on the other display.

It will be appreciated that the present invention minimizes movement of the contact lens C. That is, once the contact lens C has been placed on the transparent contact lens support 18 and moved to the inspection zone Z, it is subjected to no further movement relative to the contact lens support 18 whatsoever until testing has been completed. Rather, necessary movements are made by the imaging and illumination assemblies 14, 16. Thus, once the geometric center of the contact lens C has been determined, and the required direction and amount of relative movement between the contact lens C and the imaging and illumination assemblies 14, 16 has been established, that relative movement is carried out by the imaging and illumination assemblies 14, 16 while keeping the contact lens C stationary. Consequently, there is no possibility of the contact lens C accidentally being displaced by vibrations (which could occur if the support window 20 were being moved), whereby the inspection system might not be able to attain a proper alignment with the contact lens C at the end of the relative movement.

Also, any attempts to move the transparent window 20 could produce movement of the support 18 which could interfere with efforts being made by the operator to remove a previously inspected lens C from another section of the support 18 or to place another contact lens C onto another transparent window 20 in preparation of it being inspected.

Illumination System

A requirement of an illumination system used to inspect transparent objects is to provide a source of light which is sufficiently diffuse as to obscure details of the light source or other elements of the illumination system.

In the present system for inspecting ophthalmic lenses, the illumination system is designed to generate diffuse light to pass through the ophthalmic lenses C in the inspection zone Z. In order to avoid the need for aligning field lenses or collimating lenses which have been used in earlier systems to provide some degree of directivity, the diffusivity of each of the illumination devices 86, 86' of the illumination assembly 16 is preferably selected to be between 20° and 60°, and more preferably between 30° and 50°. The most preferred diffusivity is about 35°. Diffusivity is specified as a full width angle at which a 10% maximum of the light intensity is found off the normal axis of the intensity curve.

Figure 2:
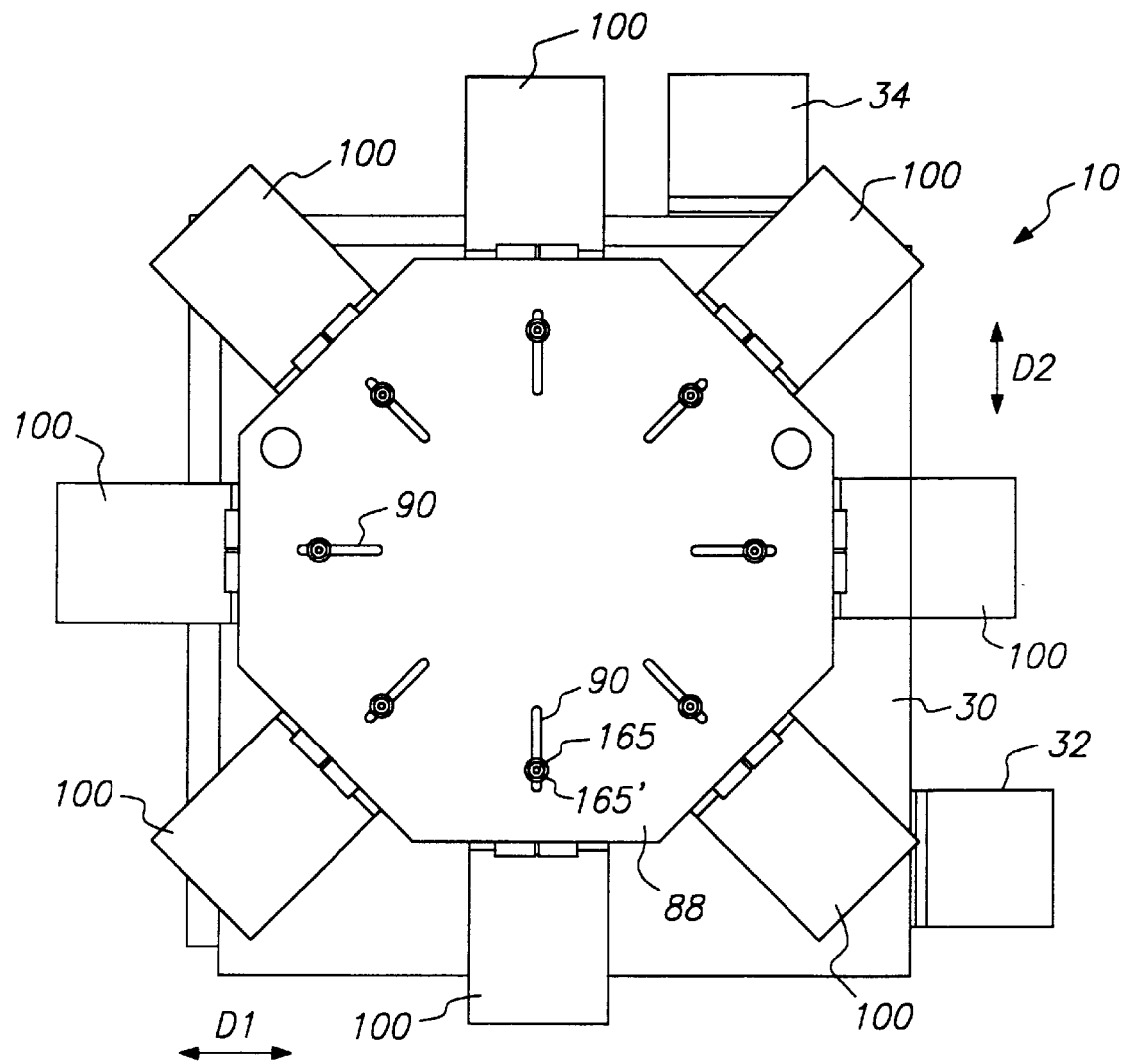
FIG. 2 is a top plan view of the apparatus depicted in FIG. 1.

As shown in FIGS. 1 and 2, there is one illumination device 86 for each of the side cameras 100 and an additional illumination device 86' for the central camera 100'. These illumination devices 86, 86' are diametrically opposed to the respective cameras 100, 100' with reference to the contact lens C and provide an extended diffuse light which fills the image cone of the camera, in conjunction with the small aperture in front of the camera.

Figure 3:
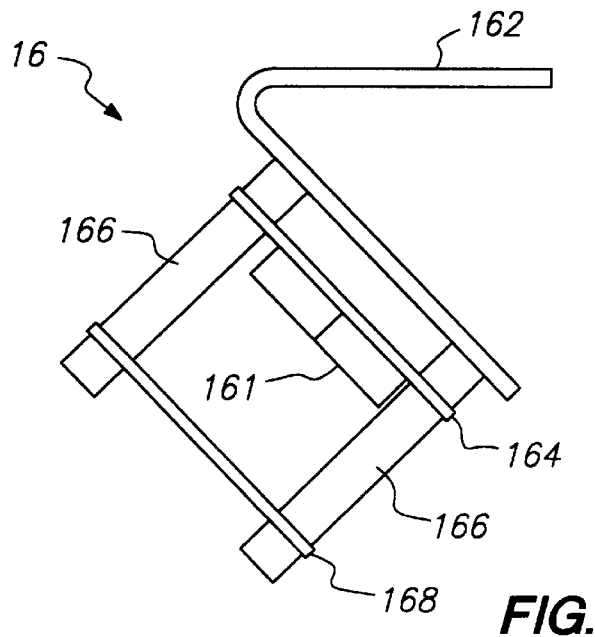
FIG. 3 is a side elevational view of the illumination assembly depicted in FIG. 1.

As shown in FIG. 3, a side illumination device 86 for the side cameras 100 includes a mounting bracket 162 which, by means of fasteners such as a nut and bolt, is connected to an adjusting slot 90 (FIG. 2). This bracket 162 is omitted from the central illumination device 86'. A light emitting diode (LED) array 161 includes, e.g., a commercially available 5X7 LED array, four such arrays being placed adjacent one another in a quadrature arrangement on a substrate 164. Such LED arrays 161 can be LTP 757 Series 0.7 inch, 5×7 dot matrix, high efficiency red display from LiteOn™, for instance.

All of the LEDs of a given array 161 are simultaneously illuminated. However, each LED array 161 is only illuminated when the opposing camera 100, 100' is activated as explained below.

Mounted by means of posts 166 is a diffuser 168, such as a commercially available holographic diffuser (see Fig.). One such diffuser is the Light Shaping Diffuser™, commercially available through Physical Optics Corporation, Torrance, Calif. A power cable provides electrical power to each of the LED arrays 86, 161'. The position of LED array 161 and the holographic diffuser 168 may be adjusted in the optical axis direction of the illumination device 86 and camera 100, 100' combinations by means of a linear adjustment mechanism, such as a threaded post 165 connected to the bracket 162 and held adjustably within a slot 90 of the plate 88 by a nut 165'.

As can be seen, the illumination devices 86, 86' require no lenses to provide directivity to the diffuse light. If the light were totally diffuse, (e.g., 90° diffusivity) without the intervention of optics, it would be difficult to image any details of the ophthalmic lens C in the inspection position. Too little diffusivity would tend to allow an image of the light source to impinge on the cameras 100, 100', thus deteriorating the image of the ophthalmic lens C.

In the preferred embodiments, the diffusivity of the holographic diffuser is between 30° and 50°, which results in a clear image of the lens while simultaneously reducing reappearance of features of no interest to the lens inspection, such as the boundary between the central portion and the peripheral portion of a contact lens C.

Figure 8:
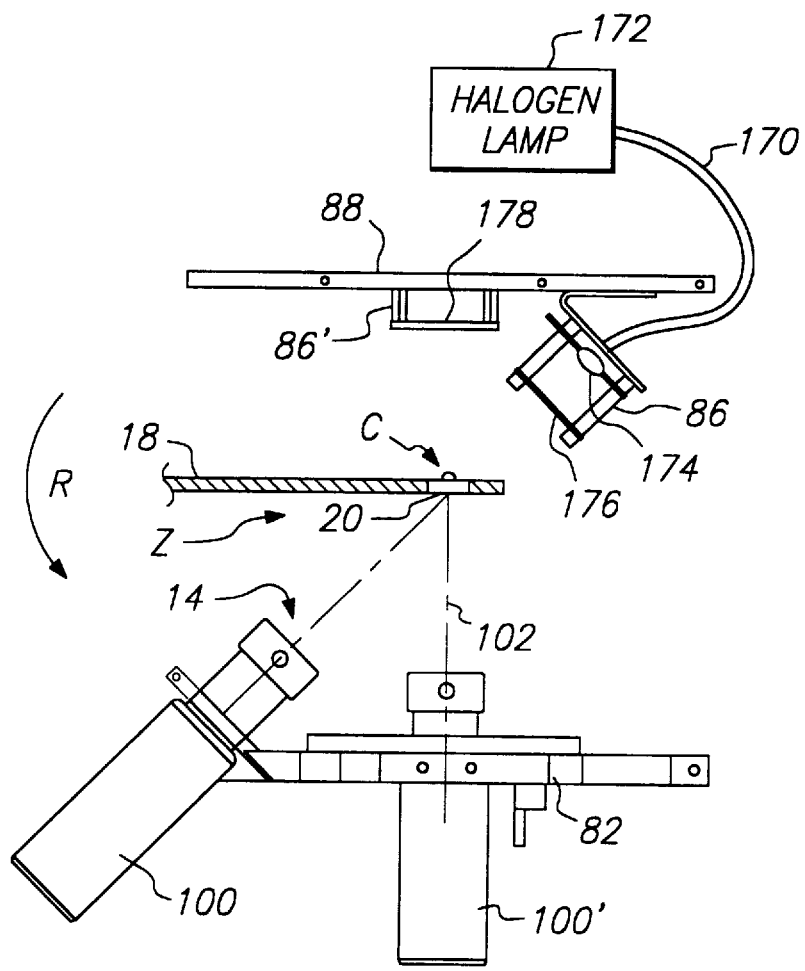
FIG. 8 is a side elevational view of part of an apparatus according to the present invention showing alternative embodiments of the illumination device.

Alternatives to the use of LEDs 161 include the use of a fiberoptic bundle 170 with a halogen bulb 172 inputting light into one end of the bundle 170 as shown in FIG. 8, with reference to side illumination device 86. The bundle of fibers 170, perhaps as wide as a quarter inch in diameter, transmits light to a collimating lens 174, which is desired to further extend the uniform light source. This embodiment provides more light than the LEDs 161, but it does not provide as much diffusivity.

The collimated light would then pass through a ground glass diffuser 176, through the lens support 18 and to a single side camera 100 which rotates in direction R about the optical axis 102 of the center camera 100' or with the fiber bundle likewise moving in an opposing fashion relative to the contact lens C.

Another alternative is to provide an electro-luminescent panel 178 as a diffuse area source. Such an electro-luminescent panel 178 is shown in FIG. 8 as the central illumination device 86'. The intensity of such an electroluminescent panel is lower and includes life duration problems due to aging. Additionally, it tends to be too diffuse, when compared to the LED arrays 161. Thus, it results in a low contrast.

Imaging System

The imaging system includes a central camera 100' to image the entire contact lens C in the inspection station and at least one radially positioned side camera 100 to image a side portion of the contact lens C. In a preferred embodiment, there are eight side cameras 100, the optical axes of which are radially disposed at 45° with reference to one another and 45° to the plane of the ophthalmic lens in the inspection position. The cameras can be any suitable type, such as the Toshiba CCD camera IK-541RA.

Figure 4:
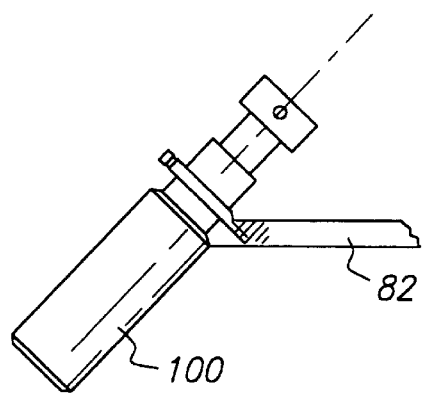
FIG. 4 is a side elevational view of a side camera of the imaging assembly depicted in FIG. 1.
Figure 5:
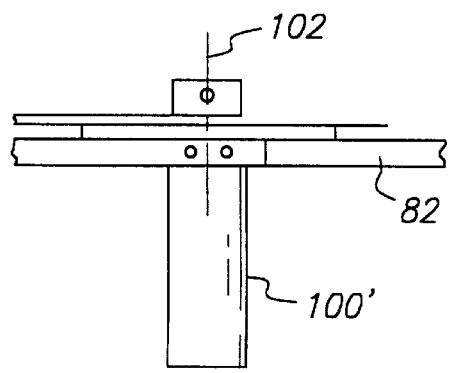
FIG. 5 is a side elevational view of a center camera of the imaging assembly depicted in FIG. 1.
Figure 6:
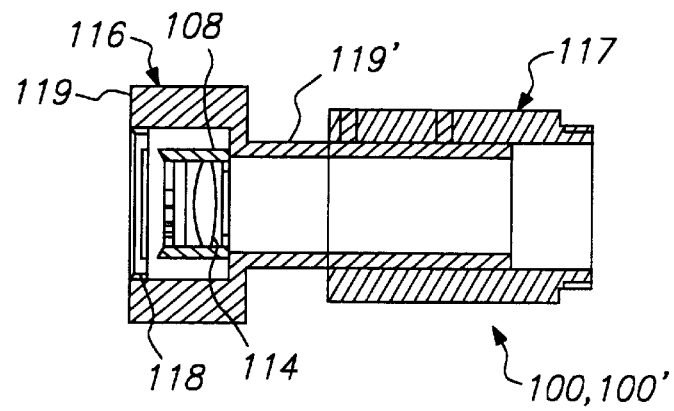
FIG. 6 is a side elevational view of a focusing mechanism, achromatic lens and aperture of cameras of the imaging assembly depicted in FIG. 1.

As shown in FIG. 4, each of the side cameras 100 is mounted to the horizontal imaging table 82 at a 45° angle thereto. As shown in FIG. 5, the central camera 100' is perpendicularly mounted to the horizontal imaging table 82 at a central portion thereof. FIG. 6 shows the details of the front end of the cameras 100, 100', including a focusing mechanism 116, achromatic lens 114, and aperture 118 of the cameras 100, 100'. The achromatic lens 114 is mounted in a lens holder 108 by a snap ring and shims. Shims are required to load the achromatic lens 114 by means of O-rings within the lens holder 108 as shown in FIG. 6. This lens holder 108 is mounted in an axially adjustable carriage 119 which also possesses the aperture 118. A portion 119' of the carriage 119 is threadingly mounted to a front housing 117 of the cameras 100, 100'.

The aperture 118 is not diffraction limited and is preferably 2 to 3 millimeters in diameter. The aperture 118, however, is small to provide a greater depth of focus and to limit the range of the collimated light to prevent light deviated from defects in the contact lens C from reaching the imaging plane of the cameras 100, 100'. An optional color filter can be added to this part of the system.

Figure 7:
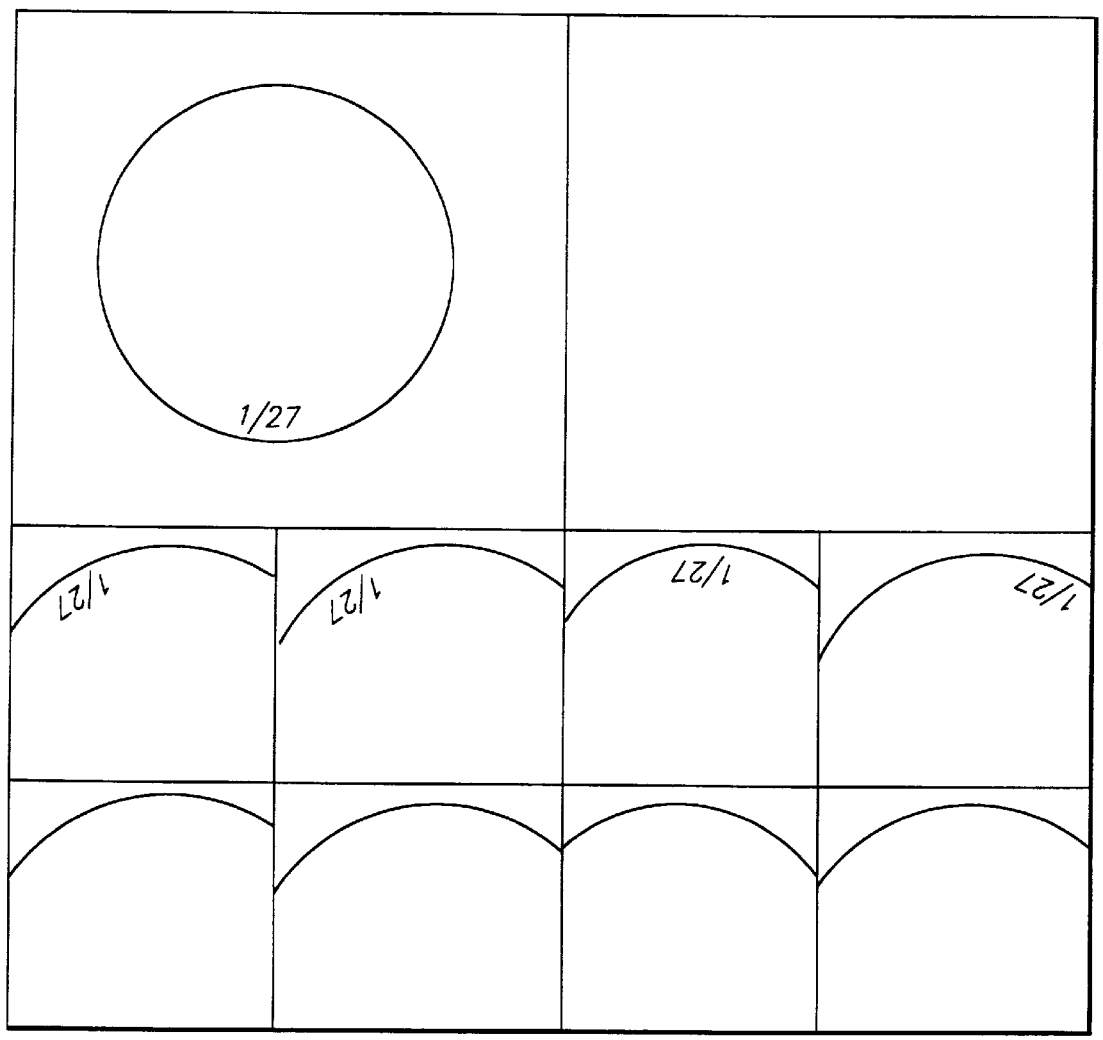
FIG. 7 shows the nine views of the central camera and eight side cameras of one embodiment of the present invention.

The combination of the small aperture 118, which provides a large depth of field, and the extended diffuse light from the illumination devices 86, 86' which fill the image cone of the cameras 100, 100', provides bright field imaging wherein light that is sharply bent due to defects in the lens being imaged to be outside the acceptance cone of the camera will not be imaged on the cameras 100, 100' and therefore appears as dark spots, but only the light that is softly bent (and therefore inside the acceptance cone) is imaged. If there are no defects or dirt on the lens, the camera would see nothing (other than the edge of the lens as a contrasting line in the otherwise bright field, as shown in FIG. 7). Also, the use of the side cameras 100 to image only a portion of the contact lens C increases the overall resolution used in the lens inspection.

Operation

In operation, an operator places a contact lens C onto the transparent window 20 of the support 18 when the window 20 is situated outside of the inspection position or zone Z, i.e., to the left of the apparatus depicted in FIG. 1. The contact lens C is placed such that its concave side is directed downwardly. The window 20 may be provided with a target (e.g., indicia) to assist the operator in placing the contact lens C onto the window 20 with sufficient precision to ensure that when the contact lens support 18 is moved to a location in which the window 20 and contact lens C are located in the inspection zone Z, at least a segment of the outer edge of the contact lens C will be imaged by the central camera 100'. The central camera 100' provides a signal representative of at least that edge segment to the computer in accordance act in accordance with well known geometric and processing principles, to determine by extrapolation the shape of the entire circumference of the contact lens C.

To precisely automatically align the contact lens C relative to a reference point, at least some portion of the contact lens edge must be in the view of the camera 100'. Otherwise, a method of searching for the contact lens C could be employed. In practice it is desired that at least 25% of the lens' edge be in view of the camera 100' to accurately calculate the xy-translation coordinates from the lens parameter. The alignment process can be iterated if less than 25% of the lens in view, or a more accurate alignment is neces-sary. Once that shape is determined, locating the geometric center of the contact lens C is deduced by known geometric principles which can be carried out by the computer 104.

The algorithm for determining the xy-translation coordinates from a raw image of the contact lens C can be described as two steps: (1) thresholding and segmenting the image of the lens C to extract the pixels which comprise the lens edge outer perimeter, and performing at least squared fit to determine the xy-translation coordinates from the lens perimeter data.

With a portion of the lens parameter in view, a threshold is applied to the view to binarize the image. The threshold is placed between the peaks of the generally bimodal histogram of the original image of the lens edge. The remaining binarized objects are then labeled, and the object with the largest bounding box is chosen as the lens edge. A threshold is applied to the labeled image to isolate the lens edge. This edge object is then filled, the pixels in the interior of the lens are converted to the same value of the lens edge, so that the pixels comprising the outer parameter of the lens edge can be extracted.

The lens edge is normally circular. Therefore, the lens perimeter can be fit to the equation $(X_i-X_O)^2+(Y_i-Y_O)^2=R^2$, wherein $(X_O, Y_O)$ are the coordinates of the geometric center of the lens, R is the lens radius, and $(X_i,Y_i)$ is the $i^{th}$ pixel in the lens perimeter. A standard least squared fit is used of the form $(A^T \cdot A) \cdot a = A^T \cdot b$, the matrix A is the matrix of basis functions for the equation of a circle, above, for the N data points from the lens perimeter. The number of data points, N, varies depending on how much of the unaligned lens edge is in view. The matrix b is the matrix of measured perimeter coordinates, and a is the matrix of the best fit values of the center coordinates of the lens. The above discussion can be extended to any shaped perimeter. For instance an elliptical fit can be computed by adding the eccentricity parameter.

Once the computer 104 determines the location of that geometric center and determines the location and distance between that center and the center 102 of the imaging assembly 14, appropriate signals are set to the motors 32, 34 for moving the upper platform 30 to shift the imaging assembly 14 and illumination assembly 16 together to a position producing proper alignment of the imaging and illumination assemblies 14, 16 with the contact lens C being inspected.

In practical application, more than one computer 104 or other suitable image processor may be simultaneously used. For instance, three computers can be employed to simultaneously process three images. In such an embodiment, three of the illumination devices 86, 86' are also simultaneously activated. To reduce optical cross-talk between the cameras, sets of illumination devices 86, 86' and cameras 100, 100' most distant from each other are simultaneously activated.

During set-up, axial and radial placement of each of the illumination devices 86, 86' is adjusted to be opposing to respective cameras 100, 100' relative to the contact lens C. The focus of each of the cameras 100, 100' is also adjusted. These adjustments assure convergence of the optical axes and focus of each illumination device/camera combination at the reference point. Such adjustment need be done only at set-up with periodic maintenance as required.

The field of view of all nine cameras 100, 100' is illustrated in FIG. 7. As can be seen, the fields of view of the side cameras 100 overlap two or three times each portion of the contact lens being viewed. Although the eight images could be integrated, instead, each is preferably separately processed and the results are integrated to avoid the additional processing power required for integrating images.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

We claim:

1. Apparatus for positioning a contact lens with respect to an inspection instrument, comprising:

a transparent surface on which a contact lens can be placed;

an illuminator for illuminating a contact lens disposed on said surface;

an imaging device directed toward a side of said lens in a direction substantially perpendicular to said surface for capturing an image of at least a portion of an outer edge of said contact lens;

analyzing means for receiving said image and determining therefrom a geometrical center of said lens and a relationship between said center and a reference point which is fixed with respect to said imaging device and said inspection instrument; and moving means for moving said imaging device and said illuminator together relative to said contact lens to bring said reference point into alignment with said center.

2. The apparatus according to claim 1 wherein said reference point is defined by an optical axis of said imaging device.

3. The apparatus according to claim 1 further comprising a first platform movable in a first horizontal direction, a second platform mounted on said first platform for movement relative thereto in a second direction oriented orthogonally relative to said first direction, said moving means comprising first and second independently actuable motors, said first motor connected to said first platform for moving said first platform together with said second platform in said first direction, said second motor connected to said second platform for moving said second platform relative to said first platform in said second direction, said imaging device mounted to said second platform.

4. The apparatus according to claim 3 wherein said illuminator is arranged to illuminate a side of said contact lens opposite a side thereof toward which said imaging device is directed.

5. The apparatus according to claim 4 wherein said imaging device and said illuminator are movable together as a unit.

6. The apparatus according to claim 1 wherein said imaging device is a camera.

7. A method of positioning a contact lens with respect to an inspection instrument, comprising the steps of:

A. placing a contact lens on a transparent surface;

B. illuminating said contact lens while on said surface;

C. directing an imaging device toward a side of said contact lens in a direction substantially perpendicular to said surface and capturing an image of at least a portion of an outer edge of said contact lens with said imaging device;

D. determining from said image a geometrical center of said contact lens and a relationship between said center and a reference point which is fixed with respect to said camera and said illuminator; and E. moving said imaging device and said inspection instrument together relative to said contact lens to bring said reference point into alignment with said center.

8. The method according to claim 7 wherein step D comprises determining a relationship between said center and a reference point defined by an optical axis of said imaging device.

9. The method according to claim 7 wherein step E comprises moving a platform on which said imaging device and said illuminator are fixedly mounted.

10. The method according to claim 7 wherein step B comprises illuminating a side of said contact lens opposite said side thereof toward which said imaging device is directed.

* * * * *

UNITED STATES PATENT AND TRADEMARK OFFICE
CERTIFICATE OF CORRECTION

PATENT NO. : 5,818,573

DATED : October 6, 1998

INVENTOR(S) : W. Michael Lafferty, Charles S. Slemon and W. James Frandsen

It is certified that an error appears in the above-identified patent and that said Letters Patent is hereby corrected as shown below:

On the title page, item [54] and Column 1,

In the title, delete "OPTHALMIC" and in its place insert --OPHTHALMIC--.

Signed and Sealed this

Second Day of February, 1999

Attest:

Attesting Officer

*Acting Commissioner of Patents and Trademarks*